(12) United States Patent
Park et al.

(10) Patent No.: US 6,646,985 B1
(45) Date of Patent: Nov. 11, 2003

(54) CONGESTION CONTROL MECHANISM IN A NETWORK ACCESS DEVICE

(75) Inventors: Jae Park, Ossining, NY (US); Michael Samori, Nanuet, NY (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,118

(22) Filed: Jun. 3, 1999

(51) Int. Cl.[7] ............................................. G01R 31/08

(52) U.S. Cl. ...................... 370/229; 370/235; 370/395; 709/212; 709/232

(58) Field of Search ............................... 370/229, 230, 370/231, 232, 235, 236, 395, 401; 709/204, 121, 212, 232; 710/22, 35, 52, 57

(56) References Cited

U.S. PATENT DOCUMENTS

| | | | | |
|---|---|---|---|---|
| 5,319,638 A | * | 6/1994 | Lin .............................. | 370/235 |
| 5,784,358 A | * | 7/1998 | Smith et al. ................. | 370/230 |
| 5,838,677 A | * | 11/1998 | Kozaki et al. .............. | 370/389 |
| 5,841,773 A | * | 11/1998 | Jones .......................... | 370/395 |
| 5,867,480 A | * | 2/1999 | Thomas et al. ............. | 370/230 |
| 5,960,215 A | * | 9/1999 | Thomas et al. .............. | 710/52 |
| 5,968,128 A | * | 10/1999 | Lauck et al. ................ | 709/232 |
| 5,970,229 A | * | 10/1999 | Thomas et al. ............. | 709/212 |
| 5,999,980 A | | 12/1999 | Tanaka et al. .............. | 709/235 |
| 6,144,635 A | * | 11/2000 | Nakagawa ................... | 370/229 |
| 6,144,640 A | * | 11/2000 | Simpson et al. ............ | 370/236 |
| 6,370,114 B1 | * | 4/2002 | Gullicksen et al. ......... | 370/229 |

OTHER PUBLICATIONS

Toshiba Corporation "TC35854F—ATM 155Mb/s SAR Chip" Preliminary Functional Specification, pp 0–20, 55–56 Feb. 27, 1998.

Song Hee Lee, "A Reactive Access Control Scheme at UNI for Congestion Control in ATM–Based B–ISDN", Proceedings 21st IEEE Conference on Local Computer Networks, pp366–373, Oct. 1996.

* cited by examiner

*Primary Examiner*—Steven Nguyen
*Assistant Examiner*—M. Phan
(74) *Attorney, Agent, or Firm*—Weingarten, Schurgin, Gagnebin Lebovici LLP

(57) ABSTRACT

A congestion control mechanism in an ATM network access device includes segmentation and reassembly (SAR) logic that sends and receives Asynchronous Transfer Mode (ATM) cells to and from interface logic that transfers the cells to and from a switch fabric. The cells are transferred on ATM connections, including flow-controlled connections for which the sending of cells by the SAR logic is controlled in response to the settings of Generic Flow Control (GFC) bits appearing in the headers of ATM cells received by the SAR logic. The interface logic receives a congestion signal indicative of the level of congestion in a transmit buffer in the switch fabric. In response to the congestion signal, the interface logic sets the GFC bits in the headers of cells transferred to the SAR logic such that the cell transmission rate is maintained at a high average level while undesirable congestion in the transmit buffer is avoided. Hysteresis is employed in the setting of the GFC bits is response to the congestion signal. The interface logic generates idle cells during periods in which no traffic-carrying cells are being transferred from the switch fabric to the SAR logic, and sends the idle cells to the SAR logic to provide GFC signalling during such periods.

11 Claims, 2 Drawing Sheets

RX CELL HEADER

| GFC | VPI | |
|---|---|---|
| VPI | VCI | |
| VCI | | |
| VCI | PT | CLP |
| HEC | | |

CONGESTION CONTROL MECHANISM IN A NETWORK ACCESS DEVICE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to the field of data networks, and in particular to network access devices that multiplex data from several incoming interfaces to a generally smaller number of outgoing interfaces.

Multiplexing network access devices, such as devices known as add/drop multiplexers, are used to concentrate network data traffic from multiple network segments onto a generally smaller number of higher-throughput network segments. In many networks, such as Asynchronous Transfer Mode (ATM) networks, incoming data frames (referred to as "cells" in ATM networks) are not necessarily transmitted on a higher-throughput segment immediately upon receipt. Consequently, the access device employs buffering in order to manage the forwarding of received frames to an output segment. Additionally, under certain traffic conditions, there may temporarily be insufficient bandwidth available on a higher-throughput segment to transmit all of the frames received from incoming network segments. During such periods, incoming frames are placed in buffers temporarily, until outgoing transmission bandwidth is available to transmit the frames. The use of buffers thus reduces the need to discard frames due to a temporary shortage of outgoing transmission bandwidth.

Various parameters affect the need for buffering in a network access device. These parameters include the relationship between the aggregate data rate of the lower-throughput segments, on the one hand, and the available transmission bandwidth on the higher-throughput segment, on the other hand. Additionally, the relationship between peak and average data rates is important. In a device in which the ratio of peak aggregate incoming data rate to peak outgoing data rate is high, for example on the order to 10:1 or greater, the buffers within the device may experience congestion when the lower-throughput segments are simultaneously bursting traffic to the device. This congestion can be reduced by limiting, a priori, the peak data rates allowed at the inputs from the lower-throughput segments. However, this approach generally has the effect of reducing the allowed average data rates as well. This approach can therefore result in relatively poor average device utilization. To improve average device utilization, it is desirable to permit a higher ratio of peak aggregate incoming data rate to peak outgoing data rate. This technique is referred to as "overbooking" of outgoing bandwidth. However, it is desirable to avoid the discarding of frames that might occur during peak periods in a device in which overbooking is utilized.

A device known as the AToM4 Segmentation and Reassembly (SAR) chip, available from Toshiba Inc. as part no. TC35854F, provides functions for implementing ATM User Network Interfaces (UNIs) in certain types of network access devices. The SAR function is required when non-ATM services are provided over ATM networks. For example, frame-based or packet-based services can be provided over ATM networks. It is necessary to segment variable-size frames or packets into several fixed-length ATM cells for transmission over the network, and then to reassemble the cells into frames at the receiving end. The AToM4 device includes features such as packet stream to ATM circuit selection, ATM Adaptation Layer (AAL) functions, segmentation and reassembly (SAR), and cyclic redundancy check (CRC) generation and checking. The AToM4 device also contains mechanisms to support traffic shaping, varieties of ATM flow control protocols, and Operations Administration and Maintenance (OAM) flows.

In particular, the AToM4 provides operation in accordance with a standard ATM flow-control scheme known as Generic Flow Control (GFC). The transmission of cells from the AToM4 is controlled in accordance with GFC signalling information appearing in cells received by the AToM4. ATM connections are divided into two categories: controlled and uncontrolled. In the AToM4, all connections for constant bit rate (CBR) and Variable Bit Rate (VBR) traffic are uncontrolled, and the rest of the connection types, e.g. Available Bit Rate (ABR) and Unspecified Bit Rate (UBR) are controlled.

A 4-bit GFC field appears in the header of ATM cells received by the AToM4. The AToM4 responds to different values in the GFC field to control the sending of cells. As described in the data sheet for the AToM4, it is contemplated that the AToM4 is flow-controlled by an ATM switch connected to the network access device in which the AToM4 resides. The switch exercises flow control by setting the GFC bits in ATM cells sent from the switch to the network access device. This flow control mechanism is used to prevent the network access device from contributing to undesirable congestion in the switch or other devices in the ATM network.

While the AToM4 SAR device provides useful functions required in certain network access devices, its design does not address the problem of buffer congestion within the network access device. Additionally, the flow-control functionality of the AToM4 has generally not been widely used, because the GFC protocol per se has not been widely used. Thus, prior network access devices have been burdened by the cost of unused functionality in the AToM4 device, as well as the cost of external logic for managing buffer congestion within the network access device.

BRIEF SUMMARY OF THE INVENTION

In accordance with the present invention, a mechanism for controlling the congestion of buffers in an ATM network access device is disclosed that exploits the flow-control capability of SAR devices such as the AToM4 device. The congestion control mechanism enhances efficiency by permitting the overbooking of buffers, while avoiding the undue discarding of ATM cells.

The congestion control mechanism includes SAR logic that sends and receives data units such as Asynchronous Transfer Mode (ATM) cells at an interface. The cells are transferred on ATM connections, including flow-controlled connections for which the sending of cells by the SAR logic is controlled in response to the settings of flow control bits appearing in the headers of ATM cells received by the SAR logic. Interface logic is coupled to the ATM interface of the SAR logic to transfer cells between the SAR logic and a switch fabric. The interface logic receives a congestion signal indicative of the level of fullness of a transmit buffer in the switch fabric. In response to the congestion signal, the interface logic sets the flow control bits in the headers of cells transferred to the SAR logic such that the cell transmission rate from the SAR to the switch fabric is maintained at a high average level while undesirable congestion in the transmit buffer is avoided. In particular, the interface logic withholds sending indications to the SAR logic that it is permitted to send cells on the flow-controlled connections during periods in which the congestion signal from the switch fabric is asserted, indicating that a predetermined threshold of transmit buffer fullness is exceeded. In a disclosed technique, a credit-based flow control protocol is employed, and the permission indications sent from the interface logic to the SAR logic are credit indications that enable the SAR logic to send additional cells.

In more particular aspects, the disclosed congestion control mechanism employs hysteresis in the setting of the flow control bits to avoid unstable operation that might arise from an excessively fast response to the congestion signal. The disclosed interface logic also generates idle cells when necessary to provide flow control commands to the SAR logic during periods in which no traffic-carrying cells are being transferred from the switch fabric to the SAR logic.

The disclosed technique distributes the buffering of ATM cells between the buffer in the switch fabric and buffers associated with the SAR logic. The probability of cell discard is reduced, while desirable overbooking of ATM switch fabric bandwidth is enabled to promote efficient utilization of network access equipment incorporating the congestion control mechanism.

Other aspects, features, and advantages of the present invention are disclosed in the detailed description that follows.

DETAILED DESCRIPTION OF THE INVENTION

Figures 1, 3:
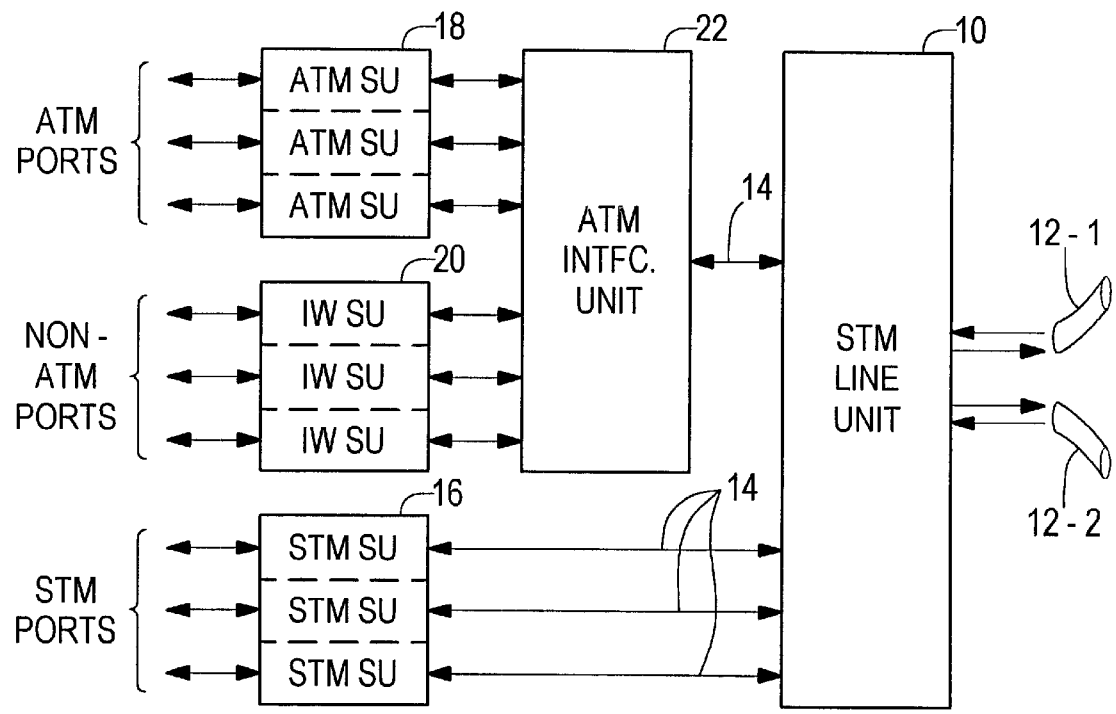
FIG. 1 is a block diagram of an ATM network access device incorporating congestion control functionality in accordance with the present invention.
FIG. 3 shows the format of an ATM cell header used to convey flow control information in the LAN interworking card of FIG. 2.

FIG. 1 shows a network device for enabling access to an Asynchronous Transfer Mode (ATM) network running over a Synchronous Optical Network (SONET) transport network. SONET operation is provided by a Synchronous Transfer Mode (STM) line unit 10 interfacing to fiber optic cables 12-1 and 12-2. The cables 12 connect the network device to other devices in the network, for example in separate point-to-point segments or in a ring topology. The STM line unit 10 converts data signals formatted as Synchronous Transport Signal-N (STS-N, where for example N equals 1, 3 or 12), appearing on service-side ports 14, to Optical Carrier-N (OC-N, where for example N equals 3, 12 or 48) on the cables 12.

The network device includes STM service units (STM SUs) 16 that provide STM interfaces to external devices that require access to the SONET network. The STM service units 16 interface directly with the STM unit 10 via corresponding ones of the service-side ports 14.

The network device also includes ATM service units 18 and Interworking service units 20, which interface to the STM line unit 10 via an ATM interface unit 22. The ATM interface unit 22 includes ATM switch fabric logic, and provides ATM transport for the ATM service units 18 and the Interworking service units 20, via the STM unit 10 and the SONET network. The ATM service units 18 provide ATM interfaces to external ATM devices that require access to the SONET network. The Interworking service units 20 provide other types of interfaces to non-ATM devices for internetwork operations. One example of an interworking service unit is a Local Area Network (LAN) service unit, which provides Ethernet interfaces to the SONET network. As described below, the LAN service unit provides Ethernet bridge functionality and LAN emulation capability.

Figure 2:
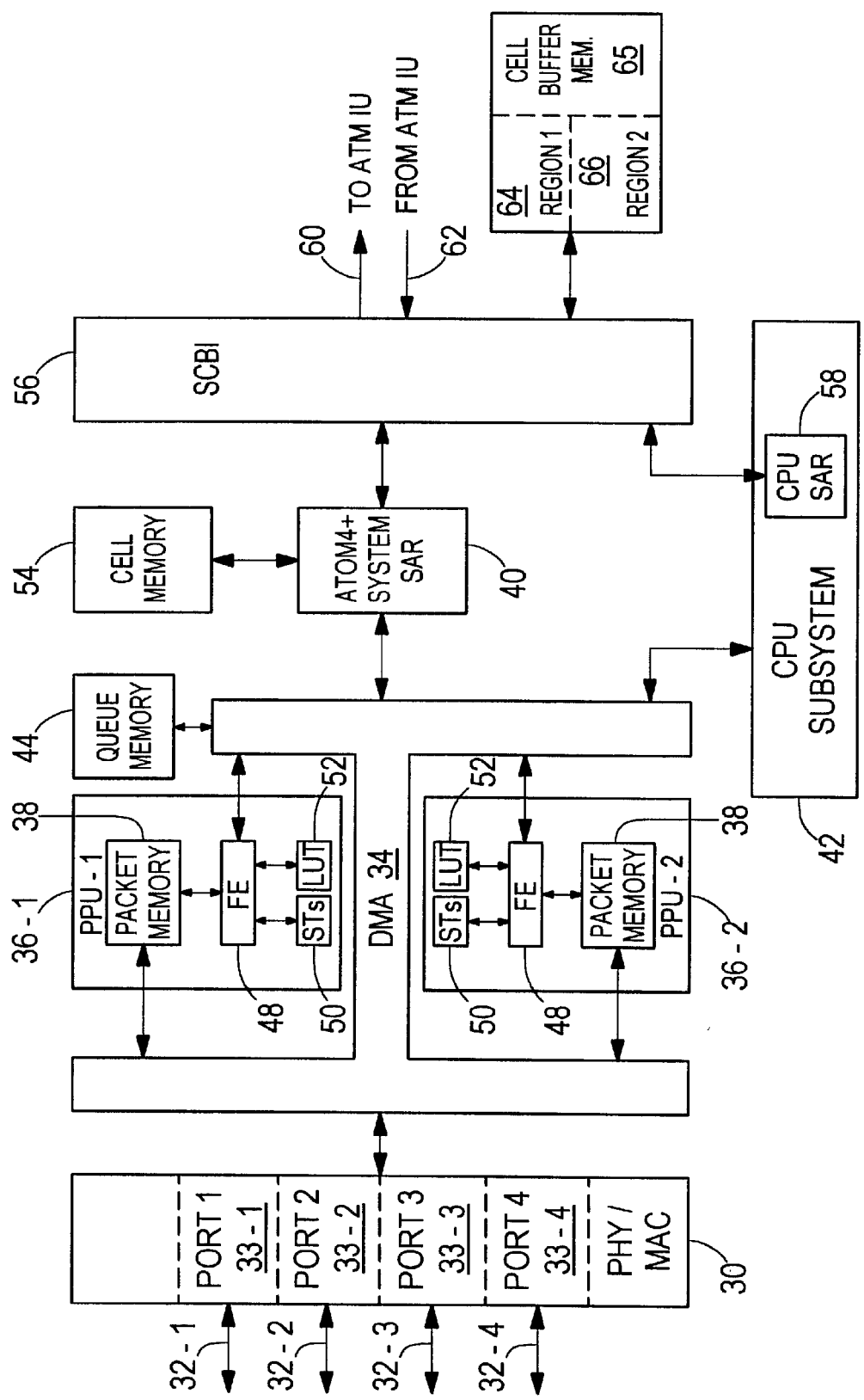
FIG. 2 is a block diagram of a Local Area Network (LAN) interworking card in the network access device of FIG. 1.

FIG. 2 shows a block diagram of a LAN service unit, which is one type of interworking service unit 20. PHY/MAC circuitry 30 interfaces to four separate Ethernet transmission lines 32-1 through 32-4 via corresponding ports 33-1 through 33-4. 10BaseT or 100BaseT Ethernet frames are received by the PHY/MAC circuitry 30, and outgoing frames are transmitted in either a full or half duplex fashion. The PHY/MAC circuitry 30 properly terminates the transmission media 32 while providing electrical isolation between the media 32 and the remainder of the circuitry on the LAN service unit. For each segment 32, PHY circuitry within the PHY/MAC block 30 performs clock and data recovery, tracks link status, and transfers received frame data to corresponding MAC devices also residing in the PHY/MAC block 30. The MAC devices check frame validity and identify frames that contain errors. Partial frame data is stored in 256byte receive FIFOs within each MAC device. Each MAC device also contains a transmit FIFO for transmit buffering. The receive and transmit FIFOs for each segment 32 interface to DMA logic 34 used to transfer frames to and from other components on the LAN service unit.

The DMA logic 34 services the receive and transmit FIFOs in the PHY/MAC block 30 on a time division multiplexed access basis. The DMA logic 34 transfers frames between the MAC FIFOs and two packet processing units (PPUs) 36-1 and 36-2. Specifically, the DMA logic 34 transfers frames to and from packet memory 38 in each PPU 36. The DMA logic 34 contains an internal cross-connect matrix that allows for flexible assignment of Ethernet ports 33 to the PPUs 36. Each PPU 36 processes two of the four Ethernet ports 33.

The DMA logic 34 also transfers frames between the PPUs 36 and a system segmentation and reassembly (SAR) device 40, such as an AToM4+™ device available from Toshiba, Inc. as part number TC358541F, which is a recent revision of the above-mentioned AToM4 device. The DMA logic 34 also provides a communication path between the PPUs 36 and a CPU subsystem 42.

When the DMA logic 34 receives a MAC frame, it creates a Buffer Descriptor and places it in packet memory 38 along with the received frame. The Buffer Descriptor contains information such as Ethernet source port 33, frame length, error status, packet data checksum, etc. The DMA logic manipulates frame pointers on queues in order to "move" the frames from one component to another. The queues are stored in a queue memory 44. The queue memory contains the following queues for each of the four Ethernet ports 33:

1. Host Receive (RX) and Transmit (TX). Used to transfer frames between the PPUs 36 and the CPU subsystem 42.

2. Ethernet RX and TX. Used to transfer frames between the PHY/MAC circuitry 30 and the PPUs 36.

3. SAR RX and TX. Used to transfer frames between the PPUs 36 and the system SAR 40.

4. Free Buffer. Used to keep track of memory buffers that may be used to store frame data.

Each PPU 36 contains a Forwarding Engine (FE) 48, which services up to two Ethernet ports 33. Logically, each FE 48 behaves as two separate processing units. Each processing unit within an FE 48 can function as either a Permanent Virtual Circuit (PVC) based bridge or a LAN Emulation Client (LEC) attached bridge.

During receive frame processing, frame pointers are passed between the DMA logic 34 and the FEs 48. Each pointer corresponds to a 128-byte page of packet memory 38. The DMA logic 34 places a frame pointer on the Ethernet RX queue after a frame is fully received by the DMA logic 34. The FE 48 examines the frame pointer, performs frame processing on the corresponding data in packet memory 38, and then instructs the DMA logic 34 to move the frame pointer to the appropriate output queue, such as the SAR RX queue. The FE 48 receives only one pointer per frame to be processed. Additional pointers are stored in the DMA logic 34 for economy of pointer movement; the information the FE 48 needs for processing is contained within the first page of the frame. Once the FE 48 instructs the DMA logic 34 where to place the pointer for a completely processed frame, the DMA logic 34 moves the remainder of the pointers onto the same queue.

Receive frame processing in the FE 48 varies depending on the type of service, e.g. port mapped bridge, 802.1d bridge, or LEC attached bridge. Generally, frame processing commences with the reading of the Buffer Descriptor and MAC header information. The Buffer Descriptor tells the FE which logical processing unit should service the incoming frame, and whether the frame contains an error. During frame processing, the header portion of the frame is manipulated in packet memory, while the payload portion of the frame remains static.

Receive frame processing by a FE 48 is considered complete when the FE 48 updates the Buffer Descriptor and writes encapsulation data for the frame back into packet memory 38. FE updates of the Buffer Descriptor include populating a Connection ID (CID) field, setting a Frame Check Sequence (FCS) status bit (preserve or drop), and indicating the offset to the start of packet data from the beginning of a buffer. The encapsulation data is used to form a corresponding frame including the frame payload for transfer over an ATM circuit via the system SAR device 40, where the ATM circuit to be used is indicated by the value of the CID field.

As shown, each FE 48 has associated search tables (STs) 50 and a Layer2/Layer3 lookup table (LUT) 52. Each LUT 52 is divided into two halves. Each ST 50 is paired with a corresponding half of the LUT 52 as part of a corresponding logical bridge. Thus, the apparatus shown in FIG. 2 is capable of implementing up to four logical bridges, two per FE 48.

Each ST 50 is a content-addressable memory (CAM) searchable by MAC address. The entries in each ST 50 contain pointers to locations in the corresponding LUT 52, which in turn contain information describing how frames containing the corresponding MAC addresses should be processed. For layer 2 (i.e., bridging) processing, the LUT 52 contains the CID, encapsulation type, and other service specific data for the frame.

MAC addresses are retrieved from the packet memory 38 and searched for in the corresponding ST 50. If a pointer to the LUT 52 is present, it is used to retrieve the CID and other information from the LUT 52. This information is used to create the encapsulation data written back into packet memory 38 for the frame. Once frame processing is complete, the frame is placed on the SAR RX Queue to be transferred to the system SAR 40.

There are several exceptions to the above processing scenarios. These exceptions are as follows:

1. Pointers for frames containing errors are returned to the DMA logic 34 by the FE 48. No frame processing is performed by the FE 48. The DMA logic 34 returns the frame pointers to the Free Buffer Queue.

2. The search table lookup indicates that the current frame should be filtered. The frame is discarded by the FE 48.

3. The search table lookup indicates that the frame is destined for the CPU subsystem 42, also referred to as the Host. Bridge Protocol Data Units (BPDUs) are one type of frame that are destined for the Host. In this case, frame data is placed on the Host RX queue rather than the SAR RX queue.

4. The search table lookup indicates a "no match" condition, i.e., the search table has no LUT pointer for the MAC address being looked up. The resulting action depends on the type of service at the port. For PVC bridging, the LUT is consulted for a CID of a broadcast Virtual Circuit (VC). This CID is placed in the Buffer Descriptor, and the frame is transferred to the system SAR 40 to be sent on the broadcast VC. For LAN Emulation (LANE) bridging, the frame is transmitted to the system SAR 40 to be sent to a Broadcast and Unknown Server (BUS) in the emulated LAN, and additionally an address resolution process is carried out to obtain a mapping between the MAC address and a VC. Subsequent frames containing the MAC address are forwarded onto the VC to which the MAC address is mapped Frames destined for the ATM/SONET network are placed on the SAR RX queue for transfer to the system SAR 40. There are four SAR RX queues, one for each Ethernet port 33 (or one per bridge instance). Frames from each SAR RX queue are time-division division multiplexed into a single input queue within the system SAR 40. The system SAR 40 segments the frames and stores them as groups of ATM cells on VC queues within a cell memory 54.

In the illustrated embodiment, the cell memory 54 has 4 MB of storage. Each VC queue in the cell memory 54 has a programmable list size, so that the available buffer space can be flexibly assigned among the VCs. The sum total of list sizes for all VCs can be larger than the total amount of available memory space to provide statistical buffer gain. Once a VC queue reaches its programmed limit within the system SAR 40, subsequent packets destined for that VC are dropped.

SCBI logic 56 (where SCBI stands for SAR Coprocessor Backplane Interface) provides an interface between the LAN service unit and the ATM interface unit 22 of FIG. 1. The SCBI logic 56 has one interface to the system SAR 40, and another interface to the CPU subsystem 42. Both of these interfaces follow the so-called UTOPIA standard, which is a multi-bit interface specially designed to provide efficient transfer of ATM cell data. The CPU subsystem 42 contains its own SAR 58 to facilitate the segmentation and reassembly of frames on multiple VCs required by software executing in the CPU subsystem 42. In a preferred embodiment, the CPU subsystem 42 employs the MPC860SAR microprocessor manufactured by Motorola, Inc.

For Ethernet sourced traffic, the SCBI logic 56 receives cells from the system SAR 40, translates the cells through a VC translation table, and transmits the cells on a high-speed serial transmission line 60 to the ATM Interface Unit 22 of FIG. 1. Also, the bits in a Generic Flow Control (GFC) field of the outgoing cells are forced to zero. This operation is described in more detail below. The SCBI logic 56 also receives cells from the CPU subsystem 42, via the CPU SAR 58, and transmits these cells on the transmission line 60 to the ATM Interface Unit 22.

Cell-based traffic is received from the ATM interface unit 22 over a high-speed serial transmission line 62. The SCBI logic 56 extracts the VPI/VCI and PT (Payload Type) fields of the incoming cells, and uses these values as inputs to a table whose entries indicate the cell type. The action taken depends on the cell type, as follows:

1. A user data cell is translated through a VC Translation Table and stored in a first cell buffer region 64 of a cell buffer memory 65 for forwarding to the system SAR 40.
2. A LAN emulation control frame (as opposed to an in-band frame) is placed untranslated into a second cell buffer region 66 of the cell buffer memory 65 for forwarding to the CPU subsystem 42.
3. Management cells are placed untranslated into the second cell buffer region 66 for forwarding to the CPU subsystem 42.

User data cells are reassembled into frames as they are transferred from the SCBI logic 56 to the system SAR 40. The system SAR 40 performs AAL5 reassembly of frames, and checks the integrity of the reassembled frames. In particular, the system SAR 40 checks for and flags the following conditions: (1) frames too large; (2) frames having lengths different from the AAL5 frame length field; and (3) frames having CRC errors. Reassembled frames are placed in frame lists at the frame interface of the system SAR 40. The system SAR 40 attaches a CID, an Encapsulation Type field, and a Bridge ID to the beginning of each frame on the list. These fields are set up within the system SAR 40 by operating software when a new VC is provisioned within the system. The frames and frame lists are stored in the cell memory 54.

The DMA logic 34 transfers frames out of the system SAR 40 in a time division multiplexed access manner. From each frame, the DMA logic 34 forms a Buffer Descriptor based on the CID, Encapsulation Type, Bridge ID, frame length, and the fact that the frame entered from the ATM side of the LAN service unit. The frame is placed on the SAR TX queue for the appropriate logical bridge.

The PPU 36 that receives the frame from the DMA logic 34 processes the frame in a similar manner as for frames received from the Ethernet side. The frame may be destined for the Ethernet port 33 or Host software executing in the CPU subsystem 42. Each outgoing frame encountering a "no match" condition is simply forwarded to the Ethernet port 33 associated with the bridge. Decapsulation processing for multiprotocol encapsulation and LANE bridging is performed. Processed frames are placed on either the appropriate Ethernet TX Queue or the Host RX Queue.

The DMA logic 34 forwards outgoing frames to one of four MAC controllers within the PHY/MAC circuitry 30. Each MAC controller contains a 256-byte transmit FIFO used to buffer outgoing frames. The DMA logic transfers frames into the transmit FIFO from the packet memory 38. Whenever data is available in a transmit FIFO, the corresponding PHY transmits the data onto the Ethernet media.

As previously mentioned, the network access device incorporates a flow control mechanism to obtain the efficiency benefits of overbooking connections without causing undue discarding of frames. Within the ATM interface unit 22 of FIG. 1, a 2 MB transmit buffer memory is used to provide elasticity in the transfer of cells from the service units 18 and 20 to the STM line unit 10. During initialization, the transmit buffer space is partitioned for use by the separate service units. The ATM interface unit 22 contains logic that monitors the level of fullness of the separate buffers for the service units. When the monitoring logic detects a predetermined threshold level of fullness in a buffer, it sends a congestion signal to the respective service unit via a logical serial connection carried over the transmission line 62. The congestion signal is a binary signal indicating whether or not buffer fullness exceeds the threshold level.

There are separate congestion signals for each service unit that interfaces to the ATM Interface Unit 22. Therefore, the service units can be individually controlled. Backpressure can be applied to an individual service unit that is causing congestion, without affecting the operation of other service units. This feature enhances the precision with which congestion is controlled, providing for generally smoother operation than if only a single congestion indication were provided. The manner in which the congestion signal is used by the LAN Interworking unit 20 of FIG. 2 is described below.

Referring again to FIG. 2, the system SAR 40 contains logic for selectively inhibiting the sending of cells to the SCBI logic 56. This capability is described in greater detail below. The SCBI logic 56 is responsible for monitoring the congestion signal received from the ATM Interface Unit 22, and generating appropriate signalling to the system SAR 40 to inhibit the sending of cells when congestion is detected. The SCBI logic 56 inserts this congestion signalling information into cells that are transferred in the opposite direction, from the SCBI logic 56 to the system SAR 40. When possible, the signalling information is inserted into normal traffic-carrying cells that have been received from the ATM Interface Unit 22. When no such received cells are available, the SCBI logic creates idle cells containing the desired information, and transfers these idle cells to the system SAR to carry out the desired signalling.

FIG. 3 shows the format of a 5-byte header contained in cells transferred between the SCBI logic 56 and the system SAR 40. The header contains a 4-bit Generic Flow Control (GFC) field used to carry flow control signals used by the flow control logic within the system SAR 40. The GFC field is only used within the LAN Interworking Service Unit 20 of FIG. 2, and in fact is used only between the SCBI logic 56 and the system SAR 40. The GFC field is set to all zeros in cells transferred to the ATM Interface Unit 22 over the transmission line 60. In addition, the GFC information is not carried across the cell/frame boundary between the system SAR 40 and the PPUs 36.

The GFC field is used for certain ATM connections referred to as "controlled" connections, i.e., connections for which the sending of cells by the system SAR 40 is subject to flow control using GFC information. In the illustrated embodiment, controlled connections include those providing Available Bit Rate (ABR) and Unspecified Bit Rate (UBR) services. Connections used for Constant Bit Rate (CBR) and Variable Bit Rate (VBR) services are "uncontrolled", i.e., not subject to flow control via GFC.

The GFC bits are used in a credit-based flow control scheme. The system SAR 40 maintains a 2-bit counter used to control the sending of cells. The counter is decremented when a cell is transferred from the system SAR 40 to the SCBI logic 56, and incremented when the system SAR 40 receives a cell from the SCBI logic 56 having a certain value in the GFC field. During any interval in which the counter is zero, the system SAR 40 refrains from sending any controlled cells to the SCBI logic 56. Table 1 below identifies the information conveyed by the GFC bits of cells transferred from the SCBI logic 56 to the system SAR 40.

TABLE 1

GFC Field Definition from SCBI 56 to System SAR 40

| Bit | Name | Value | Functions |
|---|---|---|---|
| 0 (MSB) | HALT | 0-no halt<br>1-halt | Stops transmission of cells from system SAR 40 for all connections |
| 1 | SET_A | 0-not set<br>1-set | Receipt of SET_A causes the 2-bit flow control counter to be incremented, but not beyond 2. |
| 2 | unused | 0 | Always 0. |
| 3 (LSB) | unused | 0 | Always 0. |

GFC information also flows from the system SAR 40 to the SCBI logic 56. Table 2 below shows GFC settings used in cells being sent from the system SAR 40 to the SCBI 56.

TABLE 2

GFC Field Definition from System SAR 40 to SCBI 56

| Bit | Name | Value | Functions |
|---|---|---|---|
| 0 (MSB) | unused | 0 | Always 0. |
| 1 | CTRL_CONN | 0 - uncntrld<br>1 - cntrld | Indicates whether cell belongs to a controlled or uncontrolled connection. If controlled, the flow-control counter has been decremented. If the count is 0, no more cells are sent for controlled connections until a SET_A is received. |
| 2 | unused | 0 | Always 0. |
| 3 (LSB) | CTRL_EQUP | 0 - uncntrld<br>1 - cntrld | Indicates whether GFC is enabled within the system SAR 40. |

As reflected in Table 2, the system SAR 40 contains a software-programmable configuration register used to selectively enable GFC operation. The status of this register is reflected in bit (3) of the GFC field in cells sent by the system SAR 40. The decrementing of the flow control counter and the inhibiting of cell sending is performed only if GFC operation is enabled.

The SCBI logic 56 employs hysteresis in the setting of the GFC bits to avoid asserting congestion control in response to brief intermittent periods of congestion. There is inherent delay in the path between the SCBI logic 56 and the logic within the ATM IU 22 that generates the congestion indication signal. The reaction time of the SCBI logic to the setting and clearing of the congestion indication signal is set such that the delay does not cause unstable operation.

Hysteresis is implemented to provide an averaging function so that a congestion control state is entered only after congestion has been experienced for a defined period. This period is the hysteresis interval, which is defined in terms of frame times, each of which is 108 clock periods ×25.72 ns. per clock period. The hysteresis interval is provisioned via software for any value N frame times, where N ranges from 1 to 256. The SCBI logic 56 enters the congestion control state if the congestion indication signal is detected for N consecutive frames, where N is the provisioned hysteresis value. When in the congestion control state, the SCBI logic 56 does not provide SET_A indications to the system SAR 40 in incoming cells, i.e., it sets bit 1 of the GFC field in incoming cells to 0. The SCBI logic 56 remains in the congestion control state until the congestion control signal is negated for N consecutive frames, where N is the provisioned hysteresis value. When not in the congestion control state, the SCBI logic 56 sends SET_A indications to the system SAR 40 in accordance with the credit-based flow-control protocol.

A congestion control mechanism in a network access device has been described. It will be apparent to those skilled in the art that modifications to and variations of the above-described apparatus and methods are possible without departing from the inventive concepts disclosed herein. Accordingly, the invention should be viewed as limited solely by the scope and spirit of the appended claims.

What is claimed is:

1. Apparatus, comprising:
segmentation and reassembly (SAR) logic operative to send and receive fixed-length data units on flow-controlled connections at a flow-controlled interface, each received data unit including a flow-control field used to send flow control commands to the SAR logic in accordance with a flow-control protocol, the SAR logic being operative to send data units on the flow-controlled connections when it has received a permission indication in the flow-control fields of received data units, and to otherwise inhibit the sending of data units on the flow-controlled connections; and interface logic coupled to the flow-controlled interface of the SAR logic and operative to transfer data units between the SAR logic and a transmit buffer in a switch fabric, the interface logic receiving a congestion signal from the switch fabric indicating whether the fullness of the transmit buffer exceeds a threshold level, the interface logic being operative when the congestion signal is deasserted to include permission indications in data units sent to the SAR logic in accordance with the flow-control control protocol, and the interface logic being operative when the congestion signal is asserted to withhold permission indications from data units sent to the SAR logic, the interface logic being further operative to generate idle data units and transfer the idle data units to the SAR logic during periods in which no traffic-carrying data units are available for transfer from the switch fabric to the SAR logic, and wherein the data units utilized by the interface logic for sending flow control commands to the SAR logic include both the traffic-carrying data units and the idle data units.

2. Apparatus according to claim 1, wherein the interface logic is further operative to employ hysteresis in the sending and withholding of permission indications to the SAR logic in response to the assertion and deassertion of the congestion signal.

3. Apparatus according to claim 2, wherein the sending and withholding of permission indications in response to the assertion and deassertion of the congestion signal are each delayed by respective delay times corresponding to respective predetermined numbers of data units.

4. Apparatus according to claim 3, wherein the predetermined numbers are in the range of 1 to 256.

5. Apparatus according to claim 3, wherein the predetermined number corresponding to the delay in sending permission indications is equal to the predetermined number corresponding to the delay in withholding permission indications.

6. Apparatus, comprising:

segmentation and reassembly (SAR) logic operative to send and receive fixed-length data units on flow-controlled connections at a flow-controlled interface, each received data unit including a flow-control field used to send flow control commands to the SAR logic in accordance with a flow-control protocol, the SAR logic being operative to send data units on the flow-controlled connections when it has received a permission indication in the flow-control fields of received data units, and to otherwise inhibit the sending of data units on the flow-controlled connections; and interface logic coupled to the flow-controlled interface of the SAR logic and operative to transfer data units between the SAR logic and a transmit buffer in a switch fabric, the interface logic receiving a congestion signal from the switch fabric indicating whether the fullness of the transmit buffer exceeds a threshold level, the interface logic being operative when the congestion signal is deasserted to include permission indications in data units sent to the SAR logic in accordance with the flow-control protocol, and the interface logic being operative when the congestion signal is asserted to withhold permission indications from data units sent to the SAR logic;

wherein:

the SAR logic maintains a flow-control counter to control the sending of data units on the flow-controlled connections, and wherein the SAR logic is operative to decrement the flow-control counter when a data unit is sent to the interface logic on a flow-controlled connection and increment the flow-control counter when a credit indication is received from the interface logic; and the SAR logic is further operative to inhibit the sending of data units to the interface logic on flow-controlled connections when the value of the flow-control counter reaches a predetermined value.

7. Apparatus according to claim 6, wherein the predetermined value is zero.

8. Apparatus according to claim 1, wherein the congestion signal is conveyed to the interface logic as part of a serial signalling channel from the switch fabric.

9. Apparatus according to claim 1, wherein the flow-controlled connections include connections on which Unspecified Bit Rate and Available Bit Rate services are provided.

10. Apparatus according to claim 6, wherein the congestion signal is conveyed to the interface logic as part of a serial signalling channel from the switch fabric.

11. Apparatus according to claim 6, wherein the flow-controlled connections include connections on which Unspecified Bit Rate and Available Bit Rate services are provided.

* * * * *

UNITED STATES PATENT AND TRADEMARK OFFICE
CERTIFICATE OF CORRECTION

PATENT NO. : 6,646,985 B1
DATED : November 11, 2003
INVENTOR(S) : Jae Park et al.

It is certified that error appears in the above-identified patent and that said Letters Patent is hereby corrected as shown below:

Column 6,
Line 40, "time-division division" should read -- time-division --.

Signed and Sealed this

Eleventh Day of January, 2005

JON W. DUDAS
*Director of the United States Patent and Trademark Office*